(12) United States Patent
Leka

(10) Patent No.: US 11,971,933 B2
(45) Date of Patent: Apr. 30, 2024

(54) SYSTEM AND METHOD OF AI ASSISTED SEARCH

(71) Applicant: Jumptuit, Inc., New York, NY (US)

(72) Inventor: Donald Leka, New York, NY (US)

(73) Assignee: Jumptuit, Inc., New York, NY (US)

(*) Notice: Subject to any disclaimer, the term of this patent is extended or adjusted under 35 U.S.C. 154(b) by 103 days.

(21) Appl. No.: 15/950,922

(22) Filed: Apr. 11, 2018

(65) Prior Publication Data

US 2019/0318044 A1 Oct. 17, 2019

(51) Int. Cl.
| | |
|---|---|
| *G06F 7/00* | (2006.01) |
| *G06F 16/00* | (2019.01) |
| *G06F 16/33* | (2019.01) |
| *G06F 16/907* | (2019.01) |
| *G06F 16/9535* | (2019.01) |
| *G06V 20/00* | (2022.01) |

(52) U.S. Cl.
CPC ...... *G06F 16/9535* (2019.01); *G06F 16/3338* (2019.01); *G06F 16/907* (2019.01); *G06V 20/35* (2022.01)

(58) Field of Classification Search
None
See application file for complete search history.

(56) References Cited

U.S. PATENT DOCUMENTS

| | | | | |
|---|---|---|---|---|
| 7,287,214 | B1 * | 10/2007 | Jenkins | G06F 16/284 715/205 |
| 2002/0138377 | A1 * | 9/2002 | Weber | G06Q 10/10 705/32 |
| 2005/0165795 | A1 | 7/2005 | Myka et al. | |
| 2009/0177685 | A1 * | 7/2009 | Ellis | G06Q 20/085 |
| 2012/0209625 | A1 | 8/2012 | Armstrong et al. | |
| 2012/0233000 | A1 | 9/2012 | Fisher et al. | |
| 2014/0095521 | A1 | 4/2014 | Blount et al. | |
| 2014/0201126 | A1 * | 7/2014 | Zadeh | A61B 5/165 706/52 |
| 2014/0222451 | A1 * | 8/2014 | Hall | G06F 19/00 705/2 |
| 2014/0222560 | A1 | 8/2014 | Kota | |

(Continued)

OTHER PUBLICATIONS

Sihvonen et al. "Subject knowledge, thesaurus-assisted query expansion and search success" In: Coupling approaches, coupling media and coupling languages for information retrieval. Apr. 26, 2004 (Apr. 26, 2004) Retrieved on Jun. 17, 2019 (Jun. 17, 2019) from <http://citeseerx.ist.psu.edu/viewdoc/download?doi=10.1.1.106.8847&rep=rep1&type=pdf> cited in Written Opinion and ISR.

(Continued)

*Primary Examiner* — Tuan A Pham
(74) *Attorney, Agent, or Firm* — Sprinkle IP Law Group

(57) ABSTRACT

A system for assisted expanded search can have a server, receiving from a user, a user search request to access semi-private data, and a controlled access non-transient memory storing at least the semi-private data. An expanded search engine can implement at least one algorithm to analyze semi-private metadata and semi-private correlated metadata related to the semi-private data to determine a primary response and an expanded response to the user search request. The system can also include a display providing the user with the primary response and the expanded response.

12 Claims, 7 Drawing Sheets

(56) References Cited

U.S. PATENT DOCUMENTS

| | | | |
|---|---|---|---|
| 2015/0113019 A1 | 4/2015 | Jiang et al. | |
| 2015/0154360 A1* | 6/2015 | Aziz | G06F 21/6245 |
| | | | 726/27 |
| 2015/0312259 A1* | 10/2015 | Alpha | G06F 16/951 |
| | | | 726/4 |
| 2016/0286244 A1 | 9/2016 | Chang et al. | |
| 2016/0354039 A1* | 12/2016 | Soto | G06N 5/046 |
| 2017/0116285 A1 | 4/2017 | Dotan-Cohen et al. | |
| 2017/0155631 A1* | 6/2017 | Du | H04L 63/08 |
| 2017/0193588 A1 | 7/2017 | Loui et al. | |
| 2017/0332231 A1 | 11/2017 | Hamilton et al. | |
| 2018/0054491 A1 | 2/2018 | Mankovskii et al. | |
| 2018/0060659 A1 | 3/2018 | He et al. | |
| 2018/0082120 A1 | 3/2018 | Verdejo et al. | |
| 2018/0255267 A1 | 9/2018 | Ido et al. | |
| 2019/0065614 A1* | 2/2019 | Bilsten | G06Q 10/10 |
| 2019/0318043 A1 | 10/2019 | Leka | |

OTHER PUBLICATIONS

Yee et al. "Faceted metadata for image search and browsing." In: Proceedings of the SIGCHI conference on Human factors in computing systems Apr. 10, 2003 (Apr. 10, 2003) Retrieved on Jun. 17, 2019 (Jun. 17, 2019) from <http:l/kevinli.net/flamenco-chi03.pdf> cited in Written Opinion and ISR.

Metz. "AI is Transforming Google Search. The Rest of the Web is Next." In: Wired. Feb. 4, 2016 (Feb. 4, 2016) Retrieved on Jun. 17, 2019 (Jun. 17, 2019) from <https://www.wired.com/2016/02/ai-is-changing-the-technology-behind-google-searches/> cited in Written Opinion and ISR.

International Search Report and Written Opinion issued in corresponding International Patent Application No. PCT/US2019/026899.

Office Action issued for U.S. Appl. No. 15/950,866, filed Feb. 5, 2020, 17 pages.

Office Action issued for U.S. Appl. No. 15/950,866, filed Feb. 16, 2023, 22 pages.

Office Action issued for U.S. Appl. No. 15/950,866, filed Aug. 16, 2023, 26 pages.

International Search Report and Written Opinion issued for International Application No. PCT/US2019/026998, mailed Jun. 9, 2019, 8 pages.

International Preliminary Report on Patentability and Written Opinion issued for International Application No. PCT/US2019/026998, mailed Oct. 13, 2020, 7 pages.

Notice of Allowance issued for U.S. Appl. No. 15/950,866, filed Dec. 20, 2023, 10 pages.

* cited by examiner

SYSTEM AND METHOD OF AI ASSISTED SEARCH

FIELD OF THE INVENTION

The present invention relates to utilizing artificial intelligence to assist a user in searching and retrieving digital data.

BACKGROUND

Human and machine generated metadata is exponentially increasing and fragmenting across an expanding universe of cloud services and Internet of Things (IoT) devices. The average person actively uses 27 apps that rely on cloud-based services in their personal lives, a combination of 36 personal and enterprise cloud services for work, owns 4 connected devices (e.g. smart phone, tablet, PC and smart TV) and uses additional devices for work. The average organization uses 1,427 cloud services across its employees including 210 collaboration services (e.g. Office 365, Slack), 76 file sharing services (e.g. Box, OneDrive), 56 content sharing services (e.g. YouTube, Flickr) and 41 social media services (e.g. Facebook, LinkedIn) and generates over 2.7 billion unique transactions each month (e.g. user logins, uploads, edits).

This proliferation of cloud services and IoT devices has accelerated the volume of data generated by consumers and organizations to 23 billion gigabytes per day. As some examples:

| Data Generated | Per Minute | Per Day |
| --- | --- | --- |
| Dropbox Files Uploaded | 833 thousand | 1.2 billion |
| Email Sent/Received | 150 million | 215 billion |
| Facebook Posts Shared | 3 million | 4.3 billion |
| Facebook Posts Liked | 4 million | 5.8 billion |
| Instagram Posts Liked | 2.5 million | 3.6 billion |
| Twitter Tweets Posted | 350 thousand | 504 million |
| YouTube Minutes of Video Uploaded | 18 thousand | 25.9 million |

This pervasive and growing problem of data fragmentation across cloud services and IoT platforms affects consumers and organizations alike. As an example of a real word situation, a user is headed to a meeting and remembers a data point that is needed for the meeting. However, the user cannot remember where or when she last saw it. Email? Cloud drive? File sharing? Chat? Social media? The only feature the user can remember that the info is about travel trends, and that there's a picture of a smiling woman and a palm tree. Currently, the user has to search for the data individually across all of her known digital connections. This increases time lost and increases the probability that the data cannot be found timely. What is needed is a means to quickly retrieve and act on data across a broad spectrum of cloud services and IoT platforms.

Even using search engines utilizing predictions, it is still a burdened search. Predictive searches are made based on factors, like the popularity and freshness of search terms, the terms the user is typing, relevant searches a user has done in the past, what other people are searching for, including popular topics that might change throughout the day. This cannot help the user to search her data.

SUMMARY

The present invention solves the above problems using a system for assisted expanded search. The system can have a server, receiving from a user, a user search request to access semi-private data, and a controlled access non-transient memory storing at least the semi-private data. An expanded search engine can implement at least one algorithm to analyze semi-private metadata and semi-private correlated metadata related to the semi-private data to determine a primary response and an expanded response to the user search request. The system can also include a display providing the user the primary response and the expanded response.

A method for assisted expanded search can have steps that can include receiving a user search request to access semi-private data. This request can be entered from any user device and received by the system or search engine. In one example, the user search request is typically transmitted over the network to a server. The user requests a search of her semi-private data, this can reside on a controlled access non-transient memory. The search engine and/or AI search assistant accesses semi-private metadata and semi-private correlated metadata related to the user search request and the semi-private data. The search engine and/or AI search assistant can analyze the semi-private metadata and the semi-private correlated metadata to determine a primary response to the user search request. Also, the search engine and/or AI search assistant can analyze the semi-private metadata and the semi-private correlated metadata to determine an expanded response to the user search request. This analysis can be performed using a processor running instructions to implement at least one algorithm. Then the user can be provided with the primary response and the expanded response.

Examples of the expanded response can include that it provides additional information related to the user search request different from the primary response. Further, the additional information in the expanded response may not be requested in the user search request.

Additional examples of the analyzing metadata to determine the expanded response include formulating, based on the analysis, an independent inquiry to an independent search engine. The AI search assistant can then acquire, from the independent search engine, an independent search result related to the independent inquiry. The providing step can then also include providing the independent search result as part of the expanded response. In a different example, the analyzing to determine the expanded response can include using image recognition to determine a plurality of features of image data within semi-private data. The plurality of features can be used as part of the determination of the expanded response.

BRIEF DESCRIPTION OF THE DRAWINGS

This invention is described with particularity in the appended claims. The above and further aspects of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

The drawing figures depict one or more implementations in accord with the present teachings, by way of example only, not by way of limitation. In the figures, like reference numerals refer to the same or similar elements.

DETAILED DESCRIPTION

Figure 1:
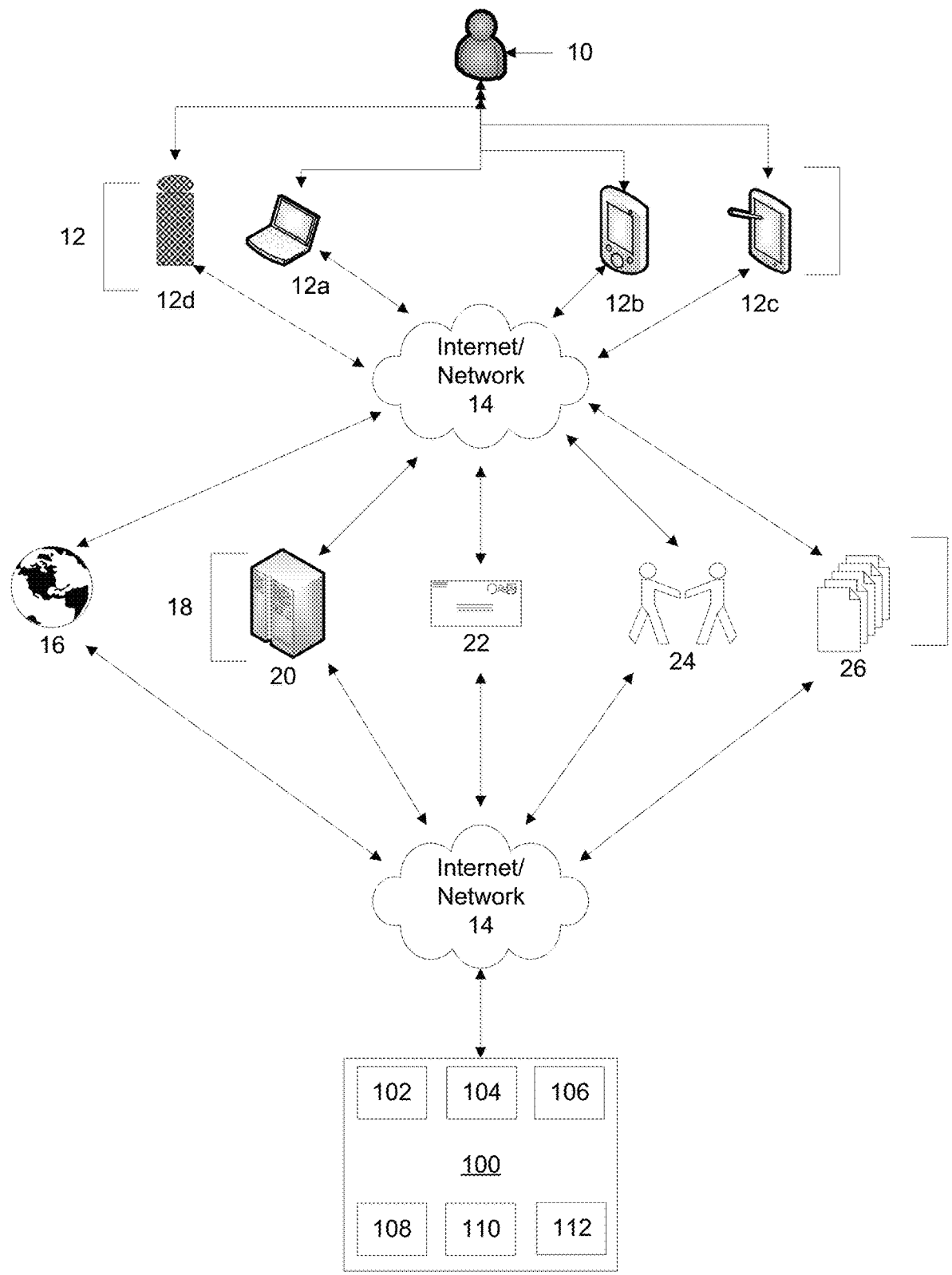
FIG. 1 is a schematic overview of the system of the present invention.

Turning to FIG. 1, an overview of the system 100 is illustrated. A user 10 can have any number of internet connect devices 12, including a laptop 12a, a smartphone 12b, a tablet 12c, a smart speaker 12d, an internet connected watch (not illustrated), smart car (not illustrated), smart appliance (not illustrated), smart TV (not illustrated), and all other networked content creation and delivery devices. The user 10 can interact with the devices which in turn are connected to the internet 14 or other networks: public, private, or worldwide. These connections allow the user to access content 16 broadly or utilize any number of services 18, including file storage 20, email servers 22, social media 24, and collaboration and content sharing 26, calendar (not illustrated), and gaming platforms (not illustrated), as just an example of the myriad of on-line services and accounts available to the user 10. The user 10 then can permit the system 100 to access her content 16 and services 18 to begin the process of data reticulation.

The system 100 can have a scanning engine 102, storage 104, analysis engine 106, search engine 108, security exchange 110, and display engine 112. Discussions of the security exchange 110, the display engine 112 and other aspects of the system 100 are incorporated herein by reference from co-pending application Ser. No. 15/950,866, filed Apr. 11, 2018 and titled "System and Method of Correlating Multiple Data Points to Create a New Single Data Point".

Figure 2:
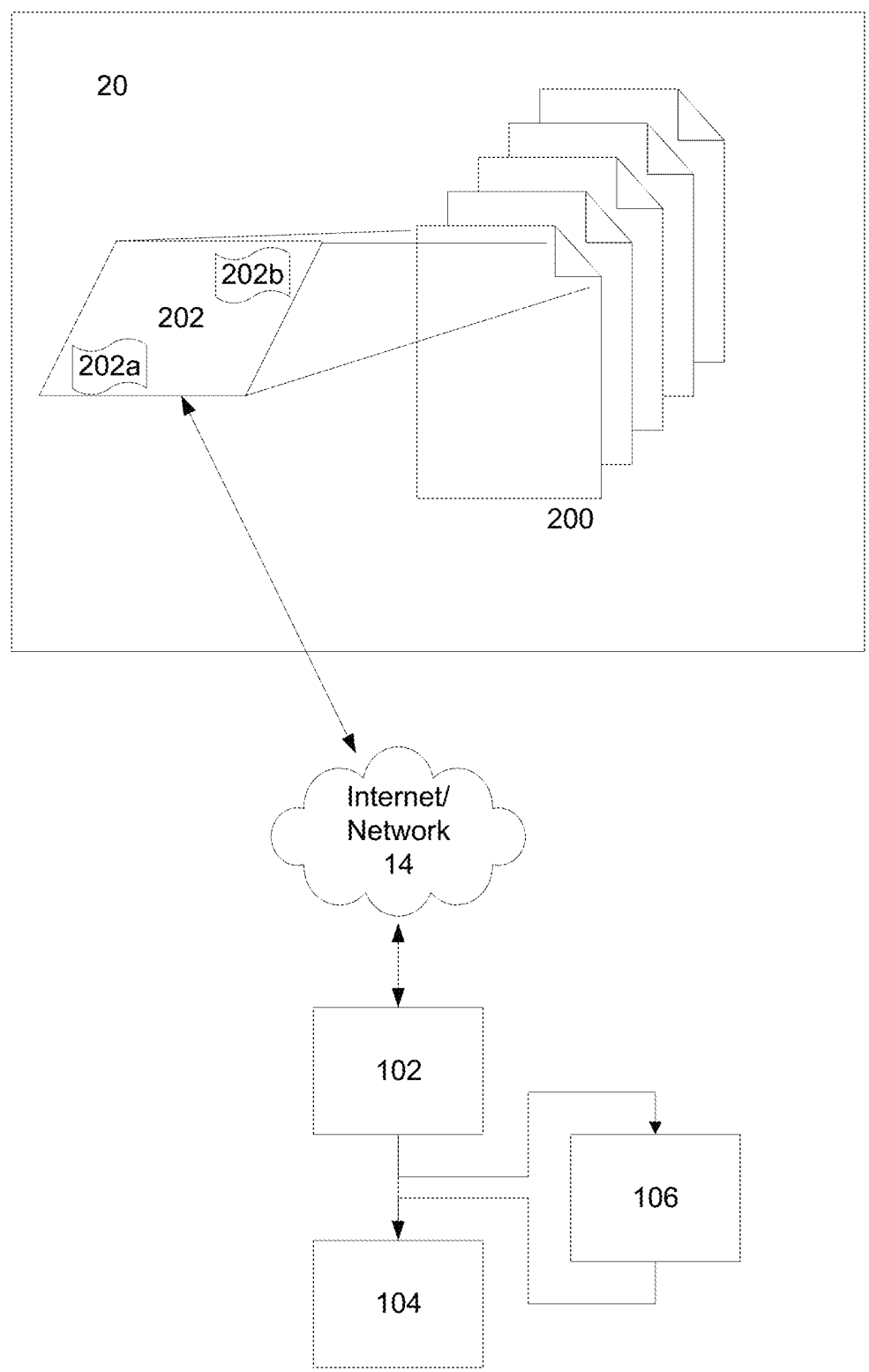
FIG. 2 illustrates an example of the data reticulation process.

FIG. 2 is an example of the system 100 that performs the data reticulation process. In an example of a first instance, the scanning engine 102 scans all of the information associated with the user's devices 12, content 16, and services 18. As is known in the art, all or most individual pieces of data 200 have metadata 202 attached. The metadata 202 describes and provides information about the data 200 without needing to access the data 200 itself. The metadata 200 can include metadata 202a added by the individual services 18 in addition to user generated metadata 202b. In one example, the scanning engine 102 can just extract the metadata 202 associated with each piece of data 200 and store the metadata 202 in the memory 104.

As a concrete example, the user 10 can store a Word document 200 in her DropBox account 20. The Word document has the user generated metadata 202b attached to it, which can include author, creation date, and store a number of changes made by the user 10 during the creation of the document. DropBox 20 can also add metadata 202a regarding the time and number of uploads, downloads, etc. The scanning engine 102 can just extract that metadata 202 without accessing the document 200. The scanning engine 102 then stores the metadata 202 for further use, described below.

Figure 3:
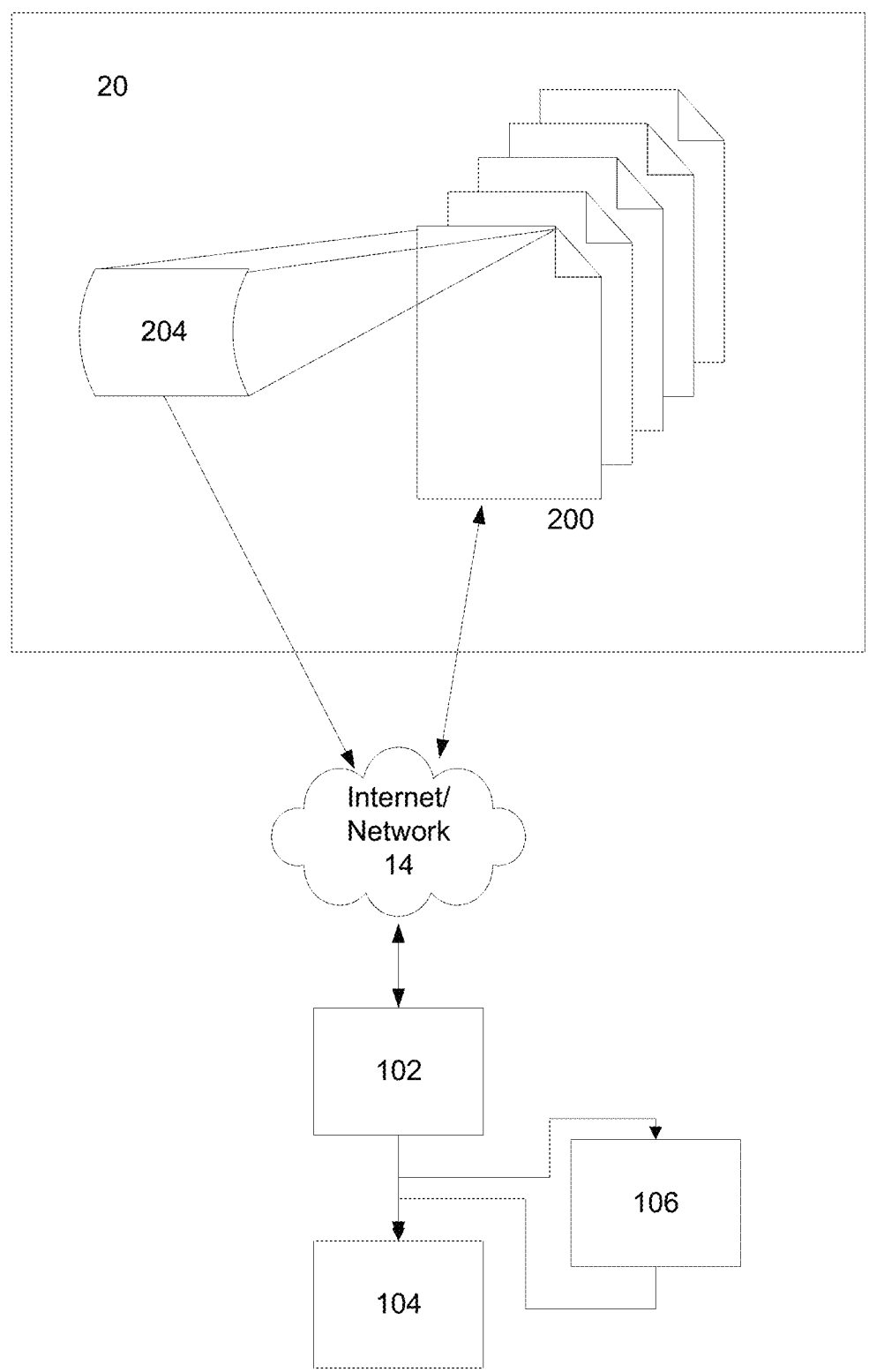
FIG. 3 illustrates another example of the data reticulation process.

Another example of the scanning engine 102 can be that the scanning engine 102 takes each piece of data 200 and creates new metadata 204 based on its own scanning and processing algorithm. FIG. 3 illustrates that the scanning engine 102 accesses each piece of data 200, performs a scan, and then creates the new metadata 204. The new metadata 204 is then stored in memory 104. In this example, extended from the one above, the scanning engine 102 reads the Word document 200 and can capture additional information (i.e. addresses and addressees of correspondence, main themes, etc.) and then creates the new metadata 204 from the read.

A further example can allow the scanning engine 102 to both read the existing metadata 202 and acquire the new metadata 204. The two metadata 202, 204 can be combined or stored separately in memory 104. Additionally, both examples above allow the data 200 to remain stored at the service 18 or device 12 and only the metadata 202, 204 is stored in the memory 104 of the system 100. In alternate examples, all of the data 200 can be redundantly backed up and stored in the memory 104 as well.

The scanning engine 102, along with scanning the user's devices 12, content 16, and services 18 can also acquire information regarding the user's profile attached with each of the devices 12 and services 18. This allows for more personalized data 208 to be provided to the analysis engine 106. The scanning engine 102 can also track the user's 10 interactions with each of the devices 12, content 16, and services 18. For example, the scanning engine 102 can track the facts that the user 10 typically accesses her social media sites 24 from her smartphone 12b but accesses e-mail primarily from her laptop 12a. These trends can also be passed to the analysis engine 106 to be added to correlated metadata 206 (discussed below) and be of use to optimize the search engine 108. For example, a search for data noted to be likely found in an e-mail can be optimized by looking first at data created on the laptop 12a.

As data 200 is constantly changing, the scanning engine 102 is constantly updating the metadata 202, 204 it provides to storage 104 and/or the analysis engine 106. The scanning engine 102 can also monitor which device 12 the user 10 is using at any one time and which devices 12 are registered to the user 10. That information can be provided to the system 100 to permit seamless delivery of data 200 to the user 10.

The scanning engine 102 can be one or more algorithms designed to analyze user data 200. Specialized algorithms can be designed for each type of data 200. Photo analysis and image recognition can be performed by one algorithm while text analysis for words and context can be done by another. These scanning modules of the scanning engine 102 can then be upgraded, debugged, and replaced without disturbing the other aspects of the scanning engine 102.

The storage/memory 104 is non-transient and can be of the type known to those of skill in the art, e.g., magnetic, solid state or optical. The storage 104 can be centralized in a server or decentralized in a cloud storage configuration. The metadata 202, 204 and/or correlated metadata 206 can be stored in a database. In one example, each user 10 can have a record or entry in the database. A user's entry is ever expanding as she generates more and more data 200 to reticulate and extract from. The correlated metadata 206 can be expanded as the user 10 also engages additional services 18. The user entry can be updated in real time, providing a constantly up-to-date profile of the user 10 and her digital footprint, allowing the system 100 to more easily provide results to the questions/requests posed to the search engine 108, as discussed below.

As the data 200 is being scanned by the scanning engine 102 and metadata 202, 204 stored in memory 104, the analysis engine 106 reviews the metadata 202, 204 and creates additional correlated data points 206 relating the data 200. The correlated data points 206 can be generated from a combination of metadata 202, 204 and interpreting the information therein. Thus, the analysis engine 106 analyzes the metadata 202, 204 and finds correlations between what may be disparate and unrelated data points 200 and saves that information as correlated metadata 206.

For example, the user 10 could have taken a trip to Italy and there are photos taken during the trip on one or more of the user's devices 12 and/or uploaded to the user's photo storage 20 and social media accounts 24. Further, there are calendar entries detailing where the user 10 is on a particular day and a Word diary of the trip. The analysis engine 106 can use the date and geotagging information in the photos to determine location. Image recognition analysis can be performed on the images to extract additional details and all of this can be compared against the calendar and diary entries for increased accuracy. Correlated metadata 206 can be created linking all of the original data 200 and additional details can also be extracted and correlated to data points 206 related to the user's likes and dislikes.

Thus, in one example, user metadata 202 and new metadata 204 can be used to link a photo, calendar, and diary entry to detail that the user 10 met a particular person at a particular place and time, and ate a meal. Thus, the correlated metadata 206 can link a picture of the Trevi Fountain, a calendar entry to meet Robert Langdon, and ate at the Il Gelato de San Crispino in Rome. In a deeper correlation, from, for example, the photos and diary 202, 204 it can be determined that pistachio is the user's 10 favorite gelato and Mr. Langdon was wearing a tweed jacket and that correlated metadata 206 can also be saved 104.

The analysis engine 106 can also be a combination of algorithms or individual services that sort and analyze the metadata 202, 204, 208 and create the correlated metadata 206. The correlated metadata 206 can be metadata not already generated from the service metadata 202a, the user metadata 202b and the personalized metadata 208. The correlated metadata 206 can include very specific details gleaned from the data 200 or relationships between the metadata 202, 204, 208 that no one set of metadata 202, 204, 208 had captured.

For example, Word, while generating document metadata 202a cannot correlate that data with images posted on Facebook and music listened to on Pandora. The analysis engine 106 can determine that after the user's trip to Italy, she developed a taste for opera. Facebook may have the images of the opera house, Outlook may have the calendar entry for the user's first opera, and Pandora may note that the user is now listening to opera streams, but the analysis engine 106 assembles the pieces to determine that the user 10 started to appreciate opera only after her trip. This analysis happens across all of the user's data.

In additional examples, the correlated metadata 206 can include data groupings. The data groupings are information that relates like files over one or more dimensions. The groupings can relate to a single event, like a trip to Italy, or even more specific to just the churches visited in Italy, or churches visited throughout Europe over may trips to different cities. The same data 200 can be in many different groupings, if the content dictates. The groupings can be formed from data 200 residing on any device 12, content 16, or service 18. The similarities between related data 200 are gleaned from the correlated metadata 206. The analysis for correlated metadata 206 can get as granular as sentiment/emotional state in the writings and images. Smiles, frowns, clipped tones, laughs, and inflections can be used to determine basic emotional states and that can be added to the correlated metadata 206.

Figure 4:
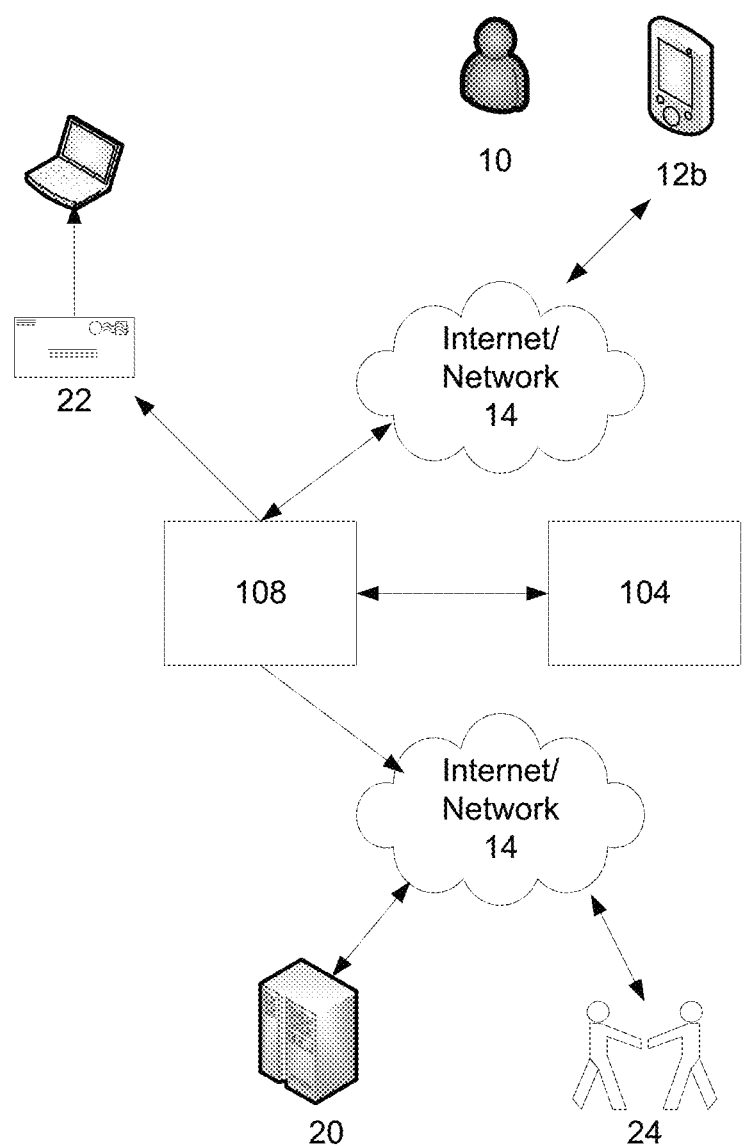
FIG. 4 illustrates an example of the search engine.

FIG. 4 illustrates the search as detailed above looking for the single data point. The user 10 queries the system 100, by voice on her smartphone 12a "I am looking for a picture of a smiling woman and a palm tree with text involving travel." The search engine 108 now searches the correlated metadata 206 in the memory 104 to find the answer to the question. The search engine 108 determines the possible answers to the question and additionally determines that one possible answer resides in the user's file storage 20 and the other resides in the user's social media account 24. The search engine 108 can then reply to the user 10 either with copies of the data 200 from both locations 20, 24 or links to those locations/data. The user 10 can further request the search engine 108 to e-mail the data to a third party. The search engine 108 can access the users e-mail account 22 and contacts to create a new e-mail with attachments and ask the user 10 to dictate the accompanying text.

The scanning, analysis and storage of correlated metadata 206 allows for a much more robust search with the search engine 208. The search engine 108 can receive user input in any form, including text and voice, to search the user's 10 data 200. The search can be general, specific, and/or somewhat free form. By using the correlated metadata 206 a user can ask for "when was I at Trevi Fountain", "who did I meet at Trevi Fountain", and/or "what was my favorite gelato flavor"? Because the correlated metadata 206 can link back the original metadata 202, 204, the original data 200 can be produced if a subsequent search query requests it. The search engine 108 can also create links or attachments for the data 200 requested.

Figure 5:
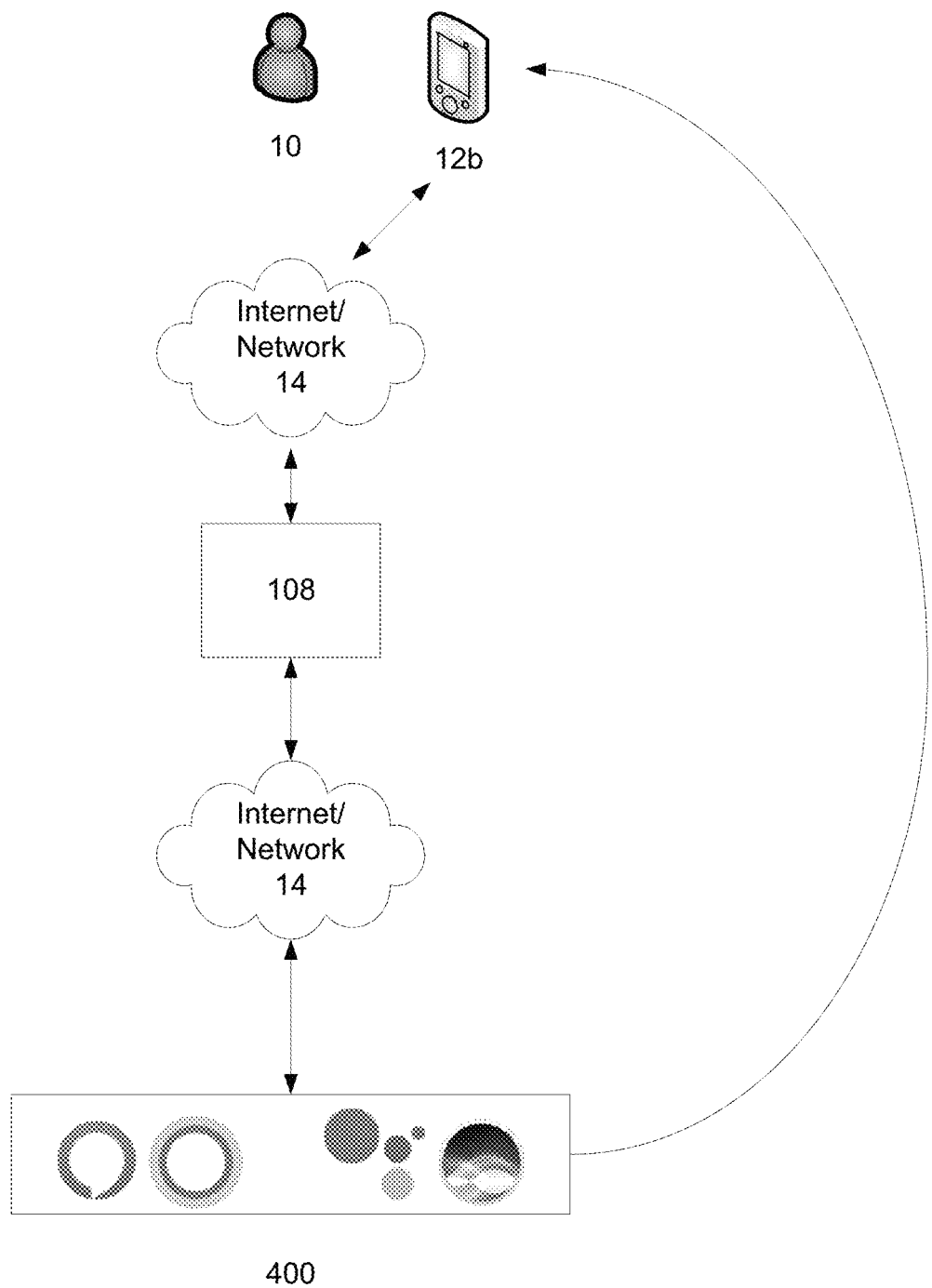
FIG. 5 illustrates an example of the system interfacing with digital assistants.

The search engine 108 can use natural language processing to search the user data 200 linked to the service 100, in most or all of the native world languages of the user 10. In addition, the search engine 108 can interface across platforms with other digital assistants 400 (e.g. Alexa, Cortana, Siri, Google Assistant, etc.) to leverage the search features built into the digital assistants. Different digital assistants 400 perform and are optimized for different search and query functions. Certain digital assistants 400 are optimized for ecommerce, device and OS operations, fact retrieval, etc. and the search engine 108 can expand the results of a user 10 inquiry. For example, the analysis engine 106 determined the user 10 is interested in opera. The search engine 108 can query an ecommerce digital assistant for books, videos and audio recordings, the fact assistant for time, date, and location of the next operatic performance near the user 10, and the OS assistant to add the feature to the user's calendar and provide directions to the performance. The results from the digital assistant 400 can be directed back through the search engine 108 or reported directly from the digital assistant 400 to the user 10, as illustrated in FIG. 5.

Given all of the above, while advanced algorithms are being used to create metadata 202, 204, 206 to be searched there is still a need for advanced machine learning algorithms (also called artificial intelligence or "AI") to assist the user 10 in requesting and retrieving the data 200 quickly and efficiently.

Figure 6:
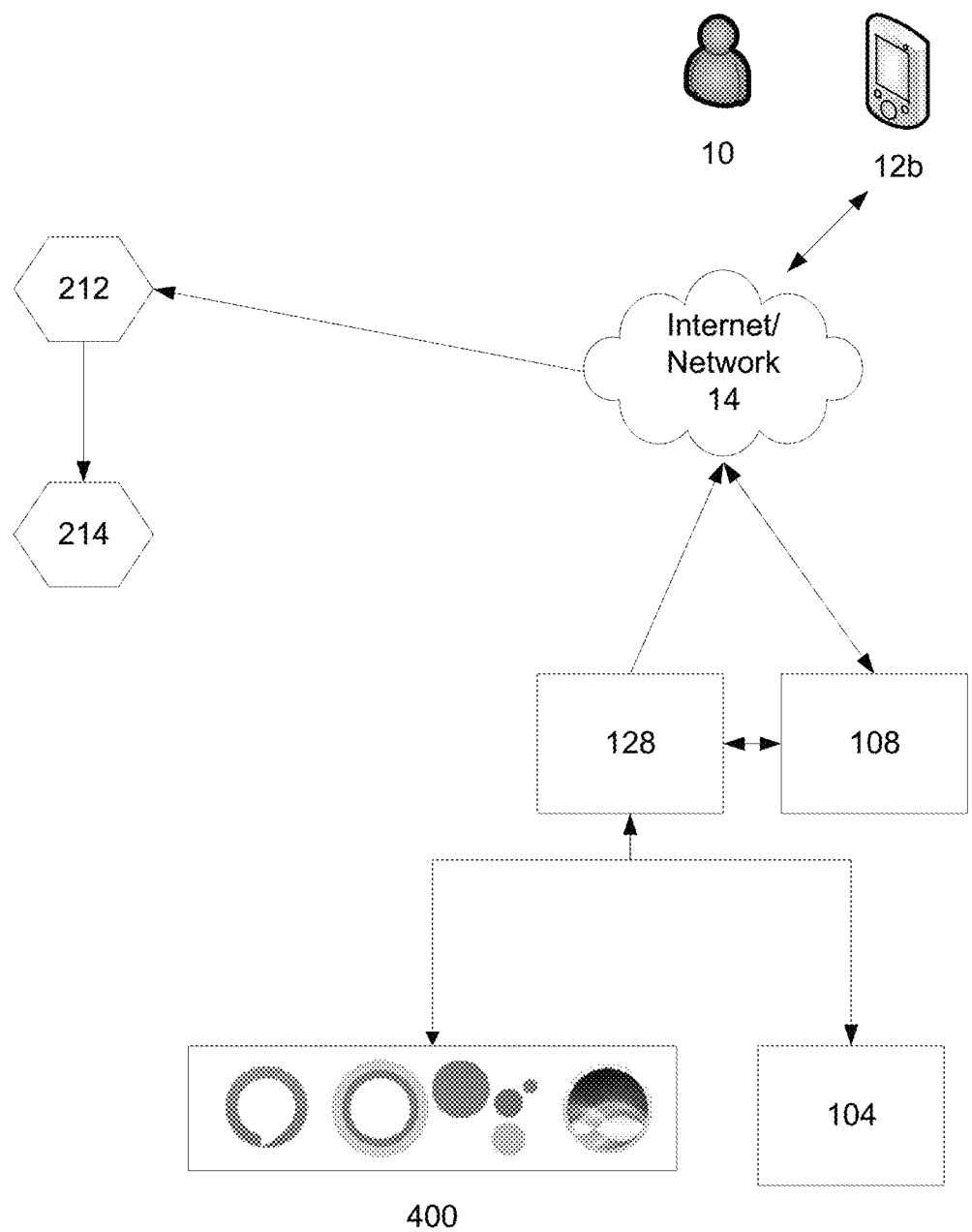
FIG. 6 illustrates an example of an AI search assistant.

As illustrated in FIG. 6, an AI search assistant 128 can be part of the user's 10 search experience. The AI search assistant 128 can access the memory 104, search engine 108 and utilize the digital assistants 400 to anticipate the user's 10 search and provide expanded results. The AI search assistant 128 can automatically provide granular details based on the metadata 202, 204, 206 surrounding the search. Thus, if a user 10 requests a search for "Robert Langdon's contact information", the search engine 108 can return a primary search result 212, which can be his contact information. However, the AI search assistant 128 can then provide expanded results 214. From the above example, the AI search assistant 128 can return a list of dates the user 10 previously met with Langdon and highlighting the last time, the list of restaurants the user 10 and Langdon previously ate in, links to all photos of the user 10 and Langdon, email and text threads, and any documents addressed to or referencing Langdon. Additionally, the expanded results 214 can include data from a general search of Langdon's social media accounts to provide summary updates on Langdon's last posts. The expanded results 214 can be provided along with the primary search result 212 or provided optionally on the user's 10 request.

Details in the expanded results 214 can be categorized based on the analysis of the metadata 202, 204, 206 208 and not a static pattern based on the initial search string. The AI search assistant 128 utilizes the metadata 202, 204, 206 208 to determine the relevant expanded results 214. Typical search engine predictive analysis utilizing the searches and results of others to assist in the user's search is not applicable when the user 10 searches her data 200.

Since photo analysis and image recognition can be performed, the AI search assistant 128 can further analyze the details of the images to provide expanded results 214 based on photographic data 200 as well. For example, the AI search assistant 128 can determine that most of the photos of the user 10 and Langdon are in front of churches. The AI search assistant 128 can then access the metadata 202, 204, 206 208 (including the latitude and longitude embedded in most digital images and image matching) to generate a list of the churches the user 10 and Langdon have visited. This can be returned as part of the expanded results 214.

Said another way, the data 200 and metadata 202, 204, 206, 208 is semi-private. Semi-private means the data 200 and metadata 202, 204, 206, 208 are not available to the general public. The data 200 and metadata 202, 204, 206, 208 are personal to the user 10 or related to the user's employment or employer. In this example, the data 200 and metadata 202, 204, 206, 208 are kept on controlled access storage 104. Controlled means that the data 200 and metadata 202, 204, 206, 208 are restricted to non-permitted users, but can be accessed by groups of permitted users. Examples include the data 200 and metadata 202, 204, 206, 208 kept on a personal smartphone, cloud storage accessible to friends and family, and/or company based servers and storage. While the user 10 and a select group have access, the majority of people cannot search or access the data 200 and metadata 202, 204, 206, 208. Thus, the past or trending searches are generally not helpful in delivering the expanded results 214.

Figure 7:
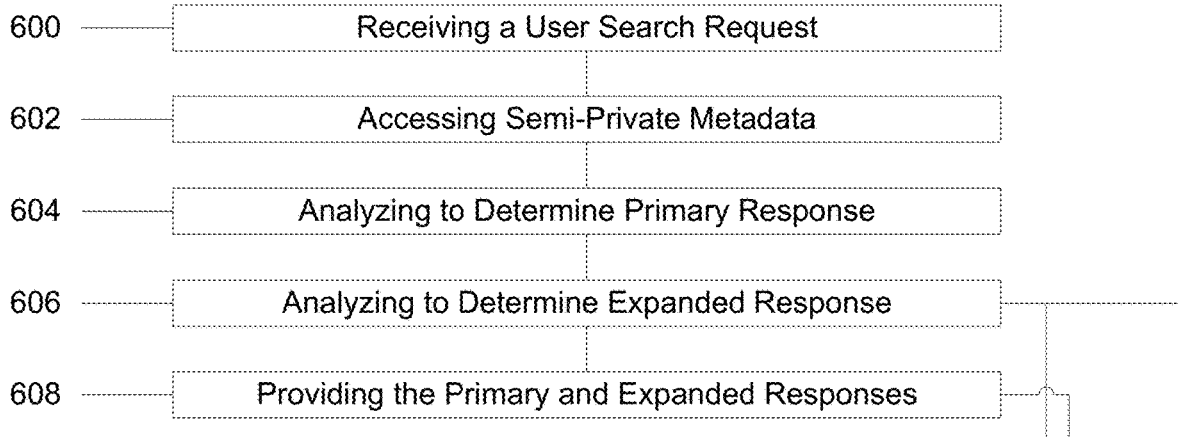
FIG. 7 illustrates an example of a method of generating a primary and expanded search response.

FIG. 7 illustrates an example of a method for assisted expanded search. The steps can include receiving a user search request to access semi-private data (step 600). This request can be entered from any user device 12 and received by the system 100 or search engine 108. In one example, the user search request is typically transmitted over the network 14 to a server. The user 10 requests a search of her semi-private data, this can reside on a controlled access non-transient memory 104. The search engine 108 and/or AI search assistant 128 accesses semi-private metadata and semi-private correlated metadata related to the user search request and the semi-private data (step 602). The search engine 108 and/or AI search assistant 128 can analyze the semi-private metadata 202 and the semi-private correlated metadata 206 to determine a primary response to the user search request (step 604). Also, the search engine 108 and/or AI search assistant 128 can analyze the semi-private metadata and the semi-private correlated metadata to determine an expanded response to the user search request (step 606). This analysis can be performed using a processor running instructions to implement at least one algorithm. Then the user 10 can be provided with the primary response and the expanded response (step 608).

Examples of the expanded response can include that it provides additional information related to the user search request different from the primary response. Further, the additional information in the expanded response may not be requested in the user search request.

Figure 8:
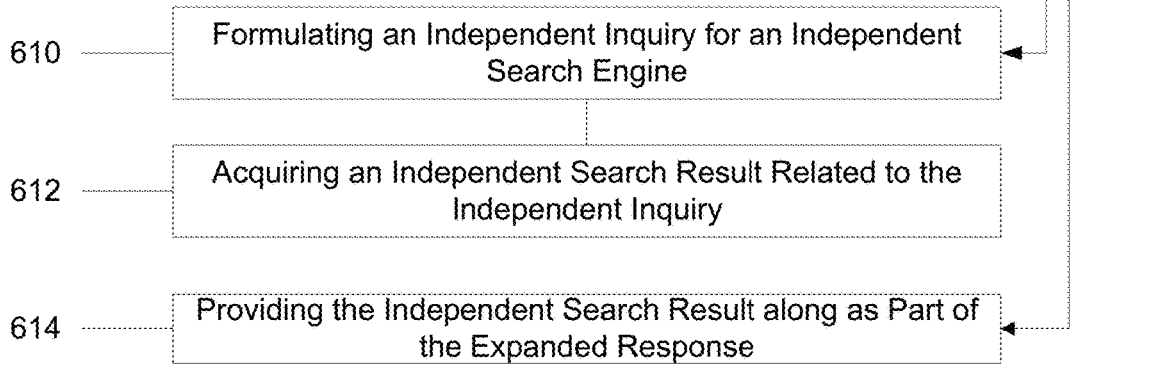
FIG. 8 illustrates an example of a method of inquiring an independent search engine.

FIG. 8 illustrates additional examples of the analyzing to determine the expanded response (step 606). Formulating, based on the analysis, an independent inquiry to an independent search engine (step 610). The AI search assistant 128 can then acquire, from the independent search engine, an independent search result related to the independent inquiry (step 612). The providing step 608 can then also include providing the independent search result as part of the expanded response (step 614).

Figure 9:
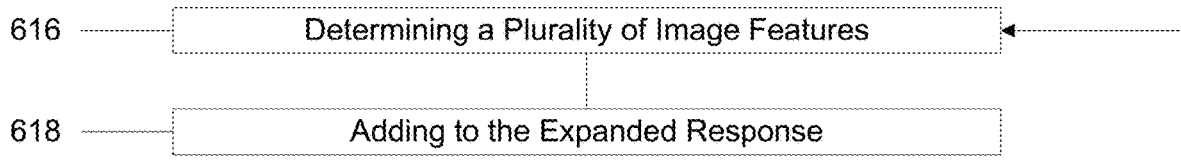
FIG. 9 illustrates a method of using image data for the expanded response.

In a different example, analyzing to determine the expanded response (step 606) can include using image recognition to determine a plurality of features of image data within semi-private data (step 616). The plurality of features can be used as part of the determination of the expanded response (step 618), see FIG. 9.

Turning back to the system 100 as a whole, one or more aspects of the search engine 108 can reside on the user devices 12 while the memory 104 and other aspects of the search engine 108 can reside either on a single server or distributed through cloud computing and storage. A decentralized computing example can have the benefit of quicker response time and the ability to leverage additional computing power and storage quickly.

The search engine 108 can be software implemented on general purpose or specifically designed hardware or processors. Each of the parts 102, 104, 106, 108, 110, 112 of the system 100 can also be distributed over a network. In one example, the scanning engine 102 can be numerous different algorithms on numerous different platforms. Thus, data 200 that comprises both text and images can be processed twice, once through the text analyzer and a second time through the image analyzer. This allows both mediums to have optimal processing.

The system 100 is robust to operate with all or most devices 12 and services 18. Table 1 is a partial list of the devices 12 and services 18 that the system 100 can currently interact with.

TABLE 1

| Collaboration | File Sharing | Content Sharing | Social Media | IoT Devices |
|---|---|---|---|---|
| Asna | Amazon Cloud Drive | Dailymotion | Facebook | Amazon Echo |
| Bitbucket | Box | DeviantArt | Foursquare | Amazon Fire |
| Evernote | Dropbox | Flickr | Google Hangouts | Android Smartphones |
| GoToMeeting | Google Drive | Imgur | | Android Tablets |
| GitHub | Microsoft | Instagram | LinkedIn | Android Smart |

TABLE 1-continued

| Collaboration | File Sharing | Content Sharing | Social Media | IoT Devices |
|---|---|---|---|---|
| | OneDrive | | | TVs |
| Gmail | | Pandora Radio | Messenger | Android Wearables |
| Google Docs | | Photobucket | Twitter | Android Smart Speakers |
| Microsoft Teams | | Picasa | Tumblr | iPhone |
| Office 365 | | Pinterest | | iPad |
| Outlook Mail | | Soundcloud | | HomePod |
| Salesforce | | Spotify | | Apple TV |
| SharePoint Online | | Vimeo | | Apple Watch |
| Skype | | Xbox Live | | Mac Computers |
| Slack | | YouTube | | Win 10 PCs |
| Slideshare | | | | Win 10 Tablets |
| Trello | | | | Win 10 Smartphones |
| WebEx | | | | Xbox One |
| Yammer | | | | Win 10 Wearables |

It must also be noted that, as used in the specification and the appended claims, the singular forms "a," "an" and "the" include plural referents unless the context clearly dictates otherwise. By "comprising" or "containing" or "including" is meant that at least the named component or method step is present in the article or method, but does not exclude the presence of other components or method steps, even if the other such components or method steps have the same function as what is named.

It is also understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art.

Certain examples of this technology are described above with reference to flow diagrams. Some blocks of the block diagrams and flow diagrams may not necessarily need to be performed in the order presented, or may not necessarily need to be performed at all, according to some examples of the disclosure.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for assisted expanded search, comprising the steps of:
   receiving at a server, from a user, a user search request to access storing semi-private data, wherein the semi-private data resides on a controlled access non-transient memory, wherein the semi-private data is personal to the user, and wherein the semi-private data comprises a plurality of data items having related thereto, in the controlled access non-transient memory, semi-private metadata and semi-private correlated metadata, the semi-private correlated metadata automatically generated from interpreting other data, wherein the semi-private correlated metadata links the plurality of data items and includes additional information than in the semi-private metadata, and wherein the other data comprises the semi-private metadata; and
   servicing the user search request, wherein servicing the user search request comprises:
      accessing the semi-private metadata and the semi-private correlated metadata, wherein the semi-private metadata and the semi-private correlated metadata are personal to the user;
      analyzing, using a processor running instructions to implement at least one algorithm for a search engine, the semi-private metadata and the semi-private correlated metadata to determine a primary response to the user search request;
      analyzing, using a processor running instructions to implement at least one algorithm for an artificial intelligence (AI) search assistant, the semi-private metadata and the semi-private correlated metadata to determine an expanded response to the user search request; and
      providing, to the user, the primary response and the expanded response.

2. The method of claim 1, wherein the expanded response provides additional information related to the user search request different from the primary response.

3. The method of claim 2, wherein the additional information in the expanded response is not requested in the user search request.

4. The method of claim 2, wherein:
   the analyzing to determine the expanded response step further comprises the steps of:
      formulating, based on the analysis, an independent inquiry to an independent search engine; and
      acquiring, from the independent search engine, an independent search result related to the independent inquiry; and
   providing the expanded response further comprises providing the independent search result as part of the expanded response.

5. The method of claim 2, wherein the analyzing to determine the expanded response step further comprises the steps of:
   using image recognition to determine a plurality of features of image data within the semi-private data; and using one or more of the plurality of features as part of the determination of the expanded response.

6. A system for assisted expanded search, comprising:

a controlled access non-transient memory storing semi-private data, wherein the semi-private data comprises a plurality of data items having related thereto, in the controlled access non-transient memory, semi-private metadata and semi-private correlated metadata, the semi-private correlated metadata automatically generated from interpreting other data, wherein the semi-private correlated metadata links the plurality of data items and includes additional information than in the semi-private metadata, and wherein the other data comprises the semi-private metadata;

a server, receiving from a user, a user search request to access the semi-private data, wherein the semi-private data is personal to the user;

an expanded search engine implementing at least one algorithm for an artificial intelligence (AI) search assistant to analyze the semi-private metadata and the semi-private correlated metadata related to the semi-private data to determine a primary response and an expanded response to the user search request, wherein the semi-private metadata and the semi-private correlated metadata are personal to the user; and a display providing the user the primary response and the expanded response.

7. The method of claim 1, wherein the other data comprises a data item from the plurality of data items.

8. The method of claim 1, wherein the plurality of data items comprises a digital image and a digital calendar entry.

9. The method of claim 8, wherein the plurality of data items comprises a digital document file.

10. The system of claim 6, wherein the other data comprises a data item from the plurality of data items.

11. The system of claim 6, wherein the plurality of data items comprises a digital image and a digital calendar entry.

12. The system of claim 11, wherein the plurality of data items comprises a digital document file.

\* \* \* \* \*